Oct. 14, 1958  C. CÜPPERS ET AL  2,855,821
APPARATUS FOR THE MEASURING OF SCOTOMATA
Filed Nov. 23, 1953  2 Sheets-Sheet 1

INVENTOR
CURT CUPPERS AND
KURT KIRCHHUBEL
By Young, Emery & Thompson
Attys.

Oct. 14, 1958  C. CÜPPERS ET AL  2,855,821
APPARATUS FOR THE MEASURING OF SCOTOMATA
Filed Nov. 23, 1953  2 Sheets-Sheet 2
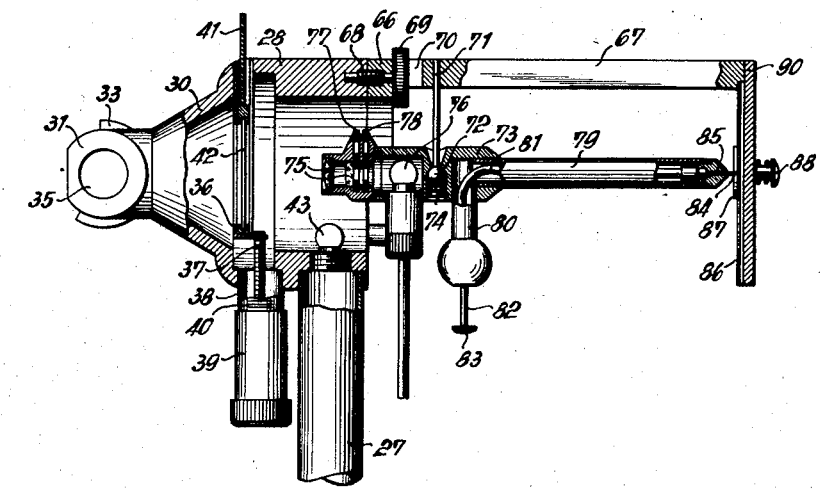
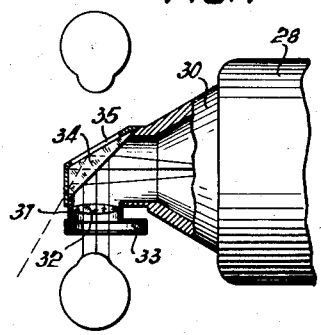
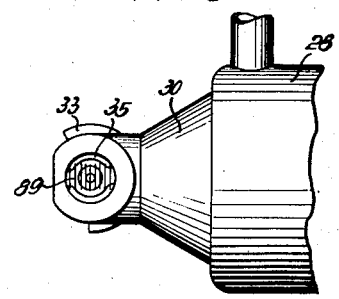
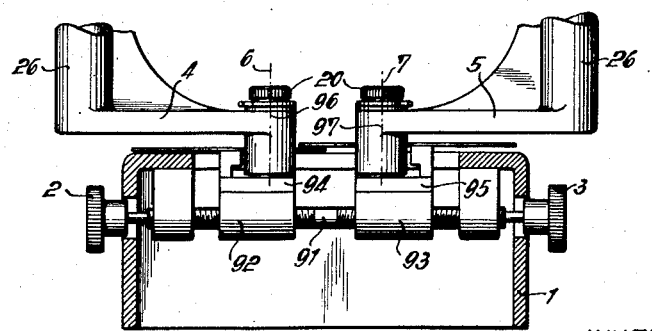
INVENTOR
CURT CUPPERS AND
KURT KIRCHHUBEL
By: Young, Emery & Thompson
Attys.

United States Patent Office 2,855,821
Patented Oct. 14, 1958

2,855,821
APPARATUS FOR THE MEASURING OF SCOTOMATA

Curt Cüppers, Giessen, and Kurt Kirchhübel, Dutenhofen, Kreis Wetzlar, Germany, assignors to "Oculus" Optikgeräte G. m. b. H., Dutenhofen, Kreis Wetzlar, Germany Application November 23, 1953, Serial No. 393,872

Claims priority, application Germany November 29, 1952

1 Claim. (Cl. 88—20)

The present invention relates to optical instruments, and is particularly directed to an apparatus for measuring scotomata, that is to say, to an apparatus by means of which, when testing eyes suffering from a scotoma, the position and size of which can be graphically determined in such a way that with the aid of records thus produced the position and extent of an operation can be decided upon.

The invention employs for the measuring of the position and size of scotomata, particularly of centrally positioned scotomata, an apparatus by means of which to each of the eyes a picture, representing for instance cross lines and circles, is presented in the direction of the eye axis, and by means of which into the picture thus presented to the eye, dots of light, irritant dots of light, dazzling dots of light, or tiny pictures are projected with the aid of a rotary projecting device, and by means of which each time those places can be recorded at which the dots of light or tiny pictures can no longer be perceived by the eye.

The apparatus as disclosed in the present invention is provided before each eye with rotatable supporting means adapted for rotation about the axis of the eye, and with a casing fastened to the supporting means at an angle to the axis of the eye. Arranged within the casing is a supporting frame for the support therein of a transparent plate provided with the dots, marks or pictures which are to be presented to the eye, a prism or mirror for the deflection of the picture presented to the eye on the plate into the direction of the eye axis, an ocular for the observation of the picture on the plate, projecting means of a rotary type for the projection of dots of light or light-marks or little pictures onto various portions of the picture on the transparent plate, and furthermore means for recording the different angular posiitons of the projecting means.

The recording means for the different angular positions of the projecting means are preferably devised as a marking device for marking the angular positions on a sheet of paper, for which purpose to the aforesaid casing a plate is attached on which the sheet of paper is fastened. According to the invention the marking device consists of a Bowden mechanism having its core provided at one end with an actuating knob, while the other end of the core is positioned in the optical axis of the projecting means and tapered to a point to serve as marking point.

An apparatus as disclosed in the present invention makes it possible to adjust the pictures which are to be presented to the eye in the eye axis also in cases where the eyes are crossed, that is to say, in cases where the person to be examined is squint-eyed. It is possible, therefore, to use the apparatus likewise as a means for the determination of the angle of squinting, and furthermore as a means for the performance of exercises likely to cure or reduce the squinting.

Additional features and advantages of the invention will be understood from a consideration of the following detailed description taken in connection with the accompanying drawings, forming a part of this specification, and in which an embodiment of the invention has been shown by way of illustration. However, we wish to say that the invention is not confined to any strict conformity with the showing of the drawings, but may be changed or modified, so long as such changes of modifications mark no material departure from the salient features of the invention as expressed in the appended claim.

In the drawings, in which like parts are referred to by the same reference numerals, Fig. 1 is a front view of the apparatus, seen from the operator's side;

Fig. 3 is a sectional view of one of the picture carriers in combination with a device for the examination and recording of scotomata (scotometer);

Fig. 4 is a sectional view of the ocular for the picture, showing the path of the light rays and the special type of prism employed;

Fig. 5 is a rear view of the ocular of Fig. 4, showing the scale on the back of the lens;

Fig. 6 is a sectional view, showing the interior of the casing on which the apparatus is mounted.

Figure 1:
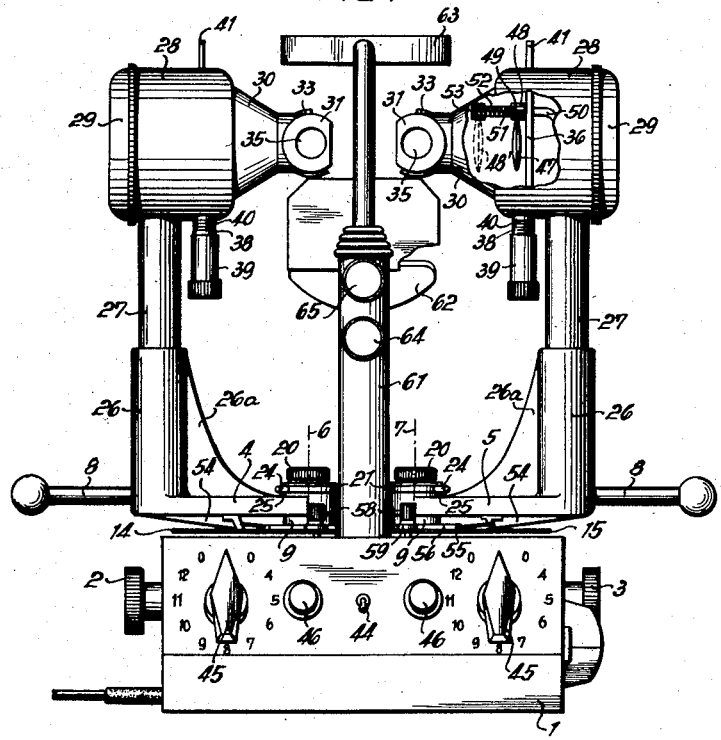

The apparatus is mounted upon a casing 1 which accommodates, in addition to the electric switches and resistances, a spindle 91 provided with a right-hand and left-hand thread, and which can be rotated by means of the knobs 2 or 3. Mounted on the right-hand and left-hand threads are two nuts 92 and 93 which are rigidly secured to the bearing blocks 94 and 95, respectively, so that rotation of the nuts on the spindle 91 is prevented, and that rotation of the spindle by means of the knobs 2 or 3 results in shifting of the nuts and of the bearing blocks secured to the nuts in a direction either toward or away from each other. Fastened to the bearing blocks 94 and 95 are the supporting pins 96 and 97 which extend through the cover of the casing 1 and on which the rotatable arms 4 and 5 are rotatably supported. The geometrical axes of rotation of the supporting arms 4 and 5 have been marked 6 and 7. For their rotation the arms 4 and 5 are provided with the handles 8. Rotatably supported underneath the rotatable arms 4 and 5 on an offset portion of each of these arms, is a short lever arm 9 which, seen from the axes 6 and 7, is radially pierced by a bore hole. In the bore hole a pin-like screw engages provided with a pointed end and with a knurled knob 10. By means of this pin-like screw the lever 9 is temporarily coupled to its appertaining rotatable arm 4 or 5. Each of the lever arms 9 carries an upwardly projecting arm 11, and each of these arms 11 is pierced by a threaded bore in which engages a spindle 12 provided with a right-hand and left-hand thread and adapted for rotation by means of a circumferentially knurled disc 13. With the aid of this knurled disc is effected the fine adjustment of the angle of rotation of the arms 4 and 5, while the coarse adjustment of the arms 4 and 5 is effected by means of the handles 8.

Positioned underneath the rotatable arms 4 and 5 are two segment-shaped plates 14 and 15, which partly overlap each other. The plates 14 and 15 are fastened on the bearing blocks 94 and 95, which also carry the supporting pins 96 and 97, so that the plates 14 and 15 are shifted conjointly with the bearing blocks 94 and 95 whenever the bearing blocks are displaced by means of the knobs 2 and 3, or the knurled disc 13. Provided on the plate 14 and 15 are the graduated scales 16 permitting the reading of the angle of rotation, and in addition to that the scales 17 indicating the appertaining diopter values, and furthermore the scale 18 indicating the distance from each other of the geometrical axes 6 and 7 corresponding to the distance between the pupils of the patient.

Screwed into each of the supporting pins 96 and 97 is a screw 19 provided with a knurled knob 20. By means of the screw 19 and a spring, two semi-circular members 21 and 22 are clampingly secured in position. Each of these semi-circular members 21 and 22 is provided with a projecting arm 23 or 24, respectively, and to each of the rotatable arms 4 and 5 is fastened an upwardly extending pin 25 in such a way that it is positioned between the two stop arms 23 and 24. The two semi-circular members 21 and 22 can be rotatably displaced with respect to each other about the axes 6 or 7, respectively, so that the distance between the two stop arms 23 and 24 and their position with respect to the axis of rotation can be adjusted at will. It will be seen, therefore, that through adjustment of these stop arms the size and position of a possible angle of rotation of the rotatable arms 4 and 5 can be accurately fixed. The object of the provision of these stop arms will hereafter be explained.

The rotatable arms 4 and 5 carry upwardly extending tubular members 26 formed integral with the arms 4 and 5, whereby the parts thus produced are reinforced by the ribs 26a. Fastened in the tubular members 26 are the tubes 27, and mounted on each of these tubes 27 is a cylindrical casing 28 which at its rear end is closed up by a detachable cover 29. At their forward ends the casings 28 carry coaxial conically tapered parts 30, terminating in tubular parts 31 having their axes extending in a direction vertical to that of the axes of the casings 28. A sectional view of the tubular part 31 is illustrated in Fig. 4. It serves as ocular for the picture support 36. For this purpose the parts 31 are provided in the proximity of their forward ends with a lens 32 whose focal distance is so selected that the picture to be viewed appears in the far point. Positioned before the lens 32 is a slot 33 serving as a means for the support therein of supplementary lenses for counterbalancing possible visual defects of the eyes to be examined. Arranged behind the lens 32 in the path of the light rays is a wedge-shaped prism 34 whose front surface extends at an angle of 45° with respect to the path of the light rays, and for that reason deflects the light rays an angle of 90°. The rear surface of the prism forms with the front surface an acute angle of such size that the rays from the picture reflected at the rear surface of the prism can not pass through the lens 32 to the eye. Provided in the rear wall of the tubular part 31 is an observation opening 35. Through this opening 35 and through the prism 34, the eye positioned before the lens 32 can be observed by the operator of the apparatus while the examination is going on. As an observation of this kind involves a slight refraction of the observation path of the light rays, the lens 32 is provided on its back with a scale 89 which gives the operator an idea, if the eye to be examined maintains an unchanged position with respect to the picture.

Fastened in the casing 28 (see Fig. 3) is a picture support 36 which is adapted for its adjustment in height by means of a screw 37 which is rotatably supported in a nut positioned in a tube 38 and fastened to a tube 39 which is slipped over the tube 38. The adjustment in height of the picture support 36 is effected through rotation of the tube 39, whereby the adjusted height can be read off at the scale 40. Into the picture support 36 can be pushed supporting frames 41 for the support therein of the transparent plates 42 provided with the pictures to be presented to the eye.

The illumination is effected with the aid of the electric lamp 43 arranged in the casing 28, in the axis of the tube 27, and which can be switched on by means of the switch 44 (Fig. 1), whereby the light intensity of each of the two lamps can be adjusted by means of the step switches 45. For short time circuit breaking, that is to say, for intermittent lighting or flash lighting, the device is provided with the switches 46 (Fig. 1).

Arranged in the casing 28, before the picture support 36 in the observation path of the light rays, there is provided a lens 47. The lens 47 is fastened to a tube 48 which is shiftably arranged for displacement along the axis of the path of the light rays, so that the lens can be shifted from its full line position 47 to its broken line position 48' (Fig. 1). The shifting is effected by means of the core 49 of Bowden mechanism 50, whereby the end 51 of the core 49 bears against the spring 53 housed in the tube 52. The tube 48 is shiftably mounted on the tube 52 and fastened to the core 49. The core 49 extends through the casing 28 and tube 27, and emerges from the rib-shaped portion 54 above the plates 14 or 15, respectively, underneath the rotatable arms 4 and 5. Its end has been marked 55. The end 55 bears against the edge of a sickle-shaped part 56 which is fastened on the plates 14 or 15, respectively, for swinging movement about the axis 57, so that shifting of the plates 14 and 15 likewise results in shifting of the sickle-shaped part 56. The part 56 can be locked in various positions with respect to the axis of rotation 6 or 7, respectively. This is effected by means of a pin 58 which can be pushed through a bore in a projecting portion 59 of the sickle-shaped part 56 into one of a plurality of bores 60 provided in the plate 14 or 15, respectively. Shifting of the core 49 of the Bowden mechanism, and accordingly also of the lens 47, does not occur when the sickle-shaped part 56 is so adjusted that its crescent shaped operating edge, which controls the movements of the end 55 of the Bowden mechanism, is positioned on the arc of a circle about the axis of rotation 6 or 7. Any displacement of the sickle-shaped part from the aforesaid position results in linear displacement of the Bowden mechanism, and consequently also of the lens 47, in the observation path of the light rays up to the maximum value adjusted by the pin 58. The displacement of the lens 47 serves the purpose of counterbalancing the refractive fault resulting from the accommodation of the eyes through rotation of the arms 4 and 5, and prevents the rotation of the arms from causing premature separation of the pictures.

Fastened on the cover of the casing 1 in the center plane of the apparatus between the two axes of rotation 6 and 7 is a tube 61, to which are rotatably secured supporting means 62 for the chin and supporting means 63 for the forehead. Both of these supporting means are arranged in such a way that they are thereby adapted for rotatable adjustment in the center plane of the apparatus, whereby the rotary adjustment simultaneously changes the height of the supporting means. The rotary adjustment of the chin supporting means 62 is effected by means of the adjustment knob 64, while the rotary adjustment of the forehead supporting means 63 is effected with the aid of the adjusting knob 65. The adjusting knobs act via screws upon levers fastened at the supporting means, whereby the levers are forced into engagement with the screws by a spring.

In Fig. 3 the back-wall 29 of the casing 28 has been removed, and instead of the back-wall 29, a ring-segment 66 which carries a supporting arm 67 has been fastened to the casing 28. The fastening of the ring-segment to the casing 28 is effected by means of a screw 68 provided with a knurled knob 69 positioned in an opening 70 of the supporting arm 67. From the supporting arm 67 extends in downward direction a bar 71 which terminates in a ball 72. It serves for the rotary support of a substantially tubular body 73, whereby a spring 74 serves the purpose of securing both parts in tight engagement with each other. In the forward portion of the tubular body 73 are arranged a lens combination 75 and an incandescent lamp 76. Positioned between the two are two discs 77, 78 which are rotatably supported in the body 73 for rotation about their axes. One of the two discs serves as supporting means for a plurality of differently colored glasses (white, red green and blue), while the other one of the two discs serves as support for diaphragms of various width. Through rotation of the discs the glasses and diaphragms can be successively moved into the path of the rays of the lamp 76. The whole constitutes a projecting mechanism by means of which dots of light of selectable color and size can be projected onto the picture plate 42, and accordingly also into the observation path of the light rays of the apparatus, whereby the position of the dot of light can be selected at will through rotation of the tubular body 73 about the ball 72.

In the rear end of the tubular body 73 is fastened, coaxially with said tubular body, a tube 79, and further, at a right angle to the tube 79, a tube 80. Accommodated in both of these tubes is a Bowden mechanism 81 provided with a core 82. The actuating knob of the Bowden mechanism has been marked 83, while the pointed end of the core has been marked 84. The end 84 is supported, coaxially with the optical combination 75, in supporting means 85 provided in the tube 79.

Fastened to the free end of the supporting arm 67 is a plate 90 to which a sheet of paper 86, provided with a system of coordinates and circles, can be clampingly secured by means of a clamping member 87 and a handle 88 in such a way that the intersecting point of the system of coordinates can be moved into alinement with the optical axis of the path of the light rays and with the pointed end 84. Pressure exerted upon the knob 83 of the Bowden mechanism causes the pointed end 84 of the core 82 to penetrate into the sheet 86, producing in the latter a mark in the shape of a tiny hole.

The apparatus illustrated in the drawings operates as follows:

First, the swinging arms 4 and 5 are adjusted by means of the scales 16 to zero position. Whereupon the chin support 62 and the forehead support 63 are rotated with the aid of the knobs 64 and 65 in such a way that the eyes of the patient are positioned in the plane of the lenses 32 which in the aforesaid zero position is the same for both of the lenses. After this the distance between the axes 6 and 7 is adjusted, through rotation of the knob 2 or 3, in conformity with the distance between the pupils of the eyes of the patient. This distance can be read of at the scale 18, whereby this scale is more or less covered up by the edge portions of the plate 14. When the chin support and forehead support as well as the distance of the pupils have been adjusted in the aforedescribed manner, the centers of rotation of the swinging arms 4 and 5 are positioned on axes extending through the center of motion of the eyes, that is to say, the swinging of the lenses 32 or of the pictures on the plate 42 takes place about the center of motion of both eyes.

Next, a supporting frame 41 is pushed into each of the casings 28, and each of the plates 42 supported in said supporting frames is provided with a picture. In other words, to each of the eyes a picture is presented, and that presentation of the picture takes place in the far point of the eye. If the eyes are normally positioned, both of the pictures are perceived as just one. Refracting defects of the eyes can be corrected through insertion of additional lenses into the slots 33 before the lenses 32.

Figure 2:
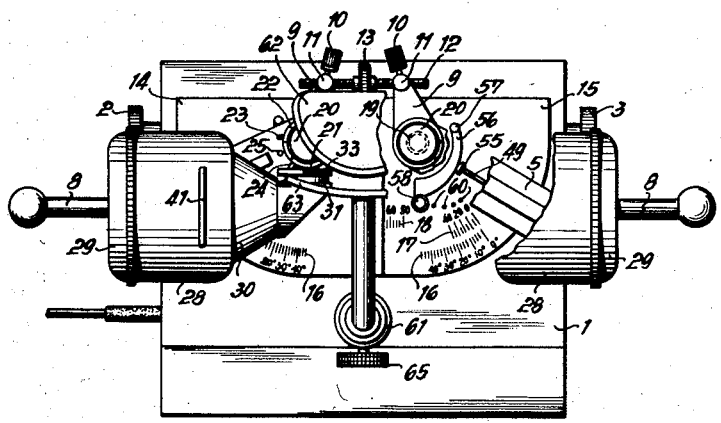
Fig. 2 is a top view of the apparatus.

If the eyes of the patient are differently positioned, the pictures are seen separate when both of the swinging arms are adjusted in zero position. For patients of this kind, the pictures can be moved into the respective eye-axes through rotation of the supports 26, 27, whereby simultaneously both pictures are caused to register. The coarse adjustment of the angle of rotation of the supports 26, 27 is effected by means of the handles 8, while the fine adjustment is effected with the aid of the knurled disc 13 (Fig. 2).

After this, a dot of light, for instance an irritant or dazzling dot of light or a tiny picture, is projected by the projector 75, 76 onto the picture presented to the eye on the picture plate 42. Through swinging of the projector, for instance in a vertical plane, the dot of light can then be caused to travel up and down the picture on the picture plate 42, whereby the places at which the dot of light is no longer perceived by the eye are marked by means of the pointed end 84 on the sheet 86 fastened on the plate 90 through pressure exerted on the knob 83. Measurings of this type are then repeated in different vertical planes until the entire outline of the scotoma has been marked on the sheet 86. Through connection of the plurality of marks by a line the exact shape of the scotoma can then be determined, whereby the marks show the scotoma in correct position with respect to the axis of the eye, and at an enlarged scale as a result of the projection.

The holding of an unchanged position of the eye during the examination of the latter can be controlled through observation of the eye through the opening 35 and the prism 34.

As the apparatus makes it possible to adjust the casing 28 in the direction of, or vertically to the eye axis, it can also be used for the determination of the angle of squinting of the patient. For measurings of this kind, the supporting arm 67 is detached from the casing 28, whereupon the latter is closed up by the cover 29.

The projecting device 75, 76 is provided only once. If there are scotomata in both of the eyes, the measurements have to be carried out successively, that is to say, the projector has to be fastened successively to both of the casings 28.

For patients with normally positioned eyes, the apparatus can be used for the determination of the angle within which the eyes are turned in inward and outward direction, and within which separate pictures are seen as a common one (width of fusion).

When the apparatus is used for the measuring of the angle of squinting, it has the advantage, when compared with known apparatus of this kind, that the picture to be viewed is presented to the eye via a lens combination which makes the picture appear always in the far point of the eye. Rotation of the arms 4 and 5 does then cause, because of the accommodation of the eyes, a change of refraction of the eyes. The result of this change of refraction of the eyes is that the pictures are perceived as separate ones already at an angle which does not correspond to the actual one. This fault of refraction is corrected with the aid of the adjustable lens 47 which by means of the Bowden mechanism 50 and the sickle-shaped part 56 is, during the rotation of the arms 4 and 5, automatically shifted in conformity with the angle of rotation. The maximum value of the shifting can be adjusted through rotation of the part 56 between zero position and a maximum shifting position. It will be seen, therefore, that the provision of the lens 47 makes it possible to determine the ranges of the actual angles of squinting.

The apparatus can also be employed for practicing purposes, that is to say, for the training of the eye muscles. In this case the eye, having the abnormal axial position, is pulled, through rotation of one or both of the arms 4 and 5, into the desired position (and maybe beyond the latter) with respect to the normal eye, in order to accustom the eye to see with eye portions corresponding to those of the normal eye. In exercises of this kind it is necessary to omit positions corresponding to the existing abnormal axial position of the eye, that is to say, to the seeing with non-corresponding eye portions. This is accomplished by means of the adjustable stops 23 and 24 which have to be adjusted in such a way that through rotation of the arms 4 and 5 the usual seeing position can not be reached, so that the eye is forced to assume a position corresponding to the desired one.

The apparatus, as used for measuring scotomata, can further by employed for the recording of squinting of the paralysation type. In cases of this kind the invention uses a plate 42 of frosted glass and a sheet 86 provided with a diagram for paralysation squinting. The plate 42 for the other eye is provided with dots whose position is ascertained by the patient with the aid of the dot of light projected by the projector. The marking of the position of the dots on the sheet 86 and their deviation from the diagram on the sheet 86 give the expert an idea of the particular kind and extent of the paralysation squinting.

What we claim as new and desire to secure by Letters Patent of the United States is:

An apparatus for the measuring of scotomata comprising, a supporting base, a supporting member before each eye rotatably and displaceably mounted on said supporting base for rotation about the axis of the eye, a tubular casing secured to the upper end of each of said supporting members at an angle to the axis of the eye, adjustable supporting means provided in each of said casings for the support therein of a transparent plate provided with the representations to be presented to the eyes, a lens arranged at each of the confronting ends of said casings in the axis of the eye, deflecting means arranged in each of said casings between said lens and said transparent plate and adapted to deflect the representations on the transparent plate into the direction of the axis of the eye, a bar having a ball joint at one end and secured by the other end to one of the casings whereby the middle point of the ball joint is in the deflected optical axis of the lens, a tubular projecting device mounted on the middle point of the joint and being swingable on the middle point around the ball joint and having a light source, rotatably mounted discs, a lens system for projecting a light point on the transparent plate in the tubular casing and having a marker in the axis of the projecting device operable by a Bowden mechanism to mark the angular position of the projecting device, a plate secured to the tubular casing positioned at right angles to the optical axis of the tubular casing, and means to secure a sheet on the plate in such position as to contact the marker to mark the angular positions.

References Cited in the file of this patent

UNITED STATES PATENTS

| | | |
|---|---|---|
| 1,454,774 | Tillyer | May 8, 1923 |
| 1,618,291 | Maggiore | Feb. 22, 1927 |
| 1,738,708 | Howard | Dec. 10, 1929 |
| 1,960,111 | Kirk | May 22, 1934 |
| 2,104,552 | Blee et al. | Jan. 4, 1938 |
| 2,262,217 | Wottring | Nov. 11, 1941 |
| 2,316,139 | Wottring | Apr. 6, 1943 |
| 2,374,854 | Feinbloom | May 1, 1945 |
| 2,567,003 | Wottring | Sept. 4, 1951 |

FOREIGN PATENTS

| | | |
|---|---|---|
| 113,641 | Great Britain | Feb. 25, 1918 |
| 326,053 | Great Britain | Mar. 6, 1930 |
| 353,599 | Great Britain | July 30, 1931 |
| 355,626 | Great Britain | Aug. 27, 1931 |

OTHER REFERENCES

"A Projection Scotometer," in The Optician periodical, June 4, 1948, pages 489–490, Patrick article.